C. B. TINSLEY.
MOTORCYCLE STAND.
APPLICATION FILED MAY 12, 1919.
1,347,355.
Patented July 20, 1920.
2 SHEETS—SHEET 1.
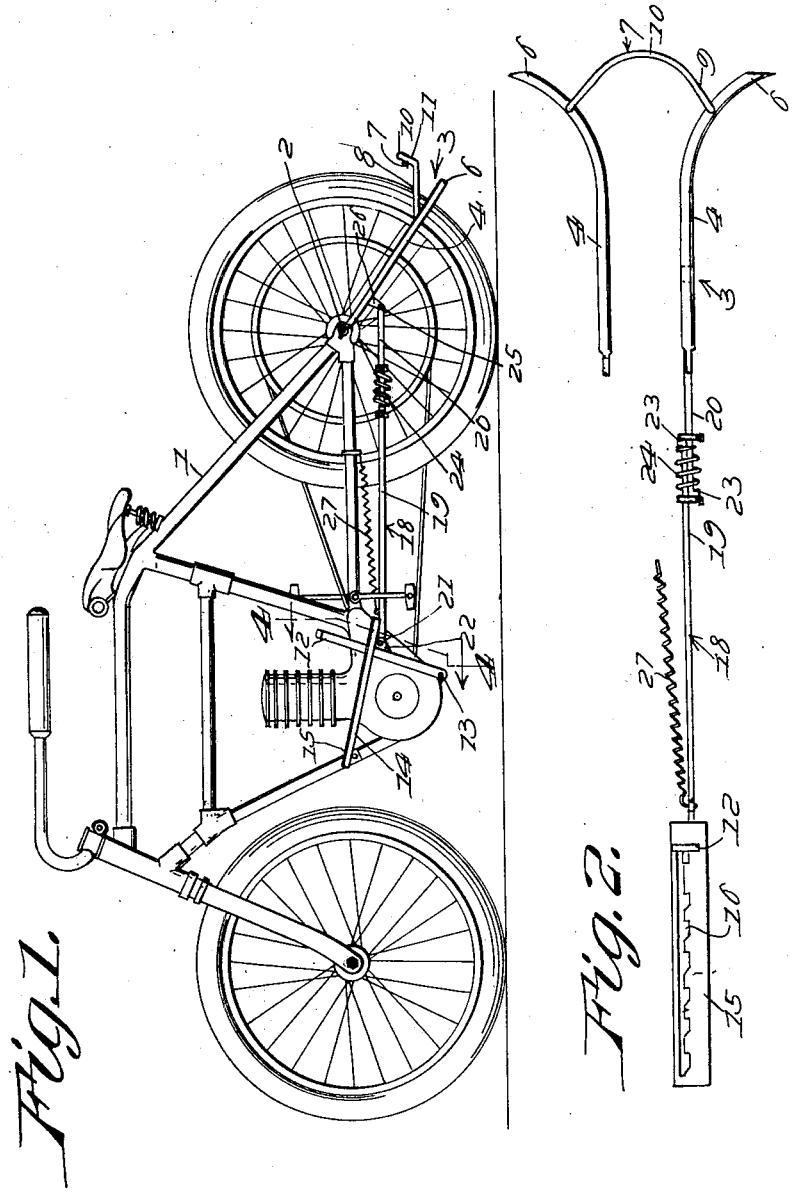
Inventor
Clarence B. Tinsley,
By
G. Hume Talbert
Attorney

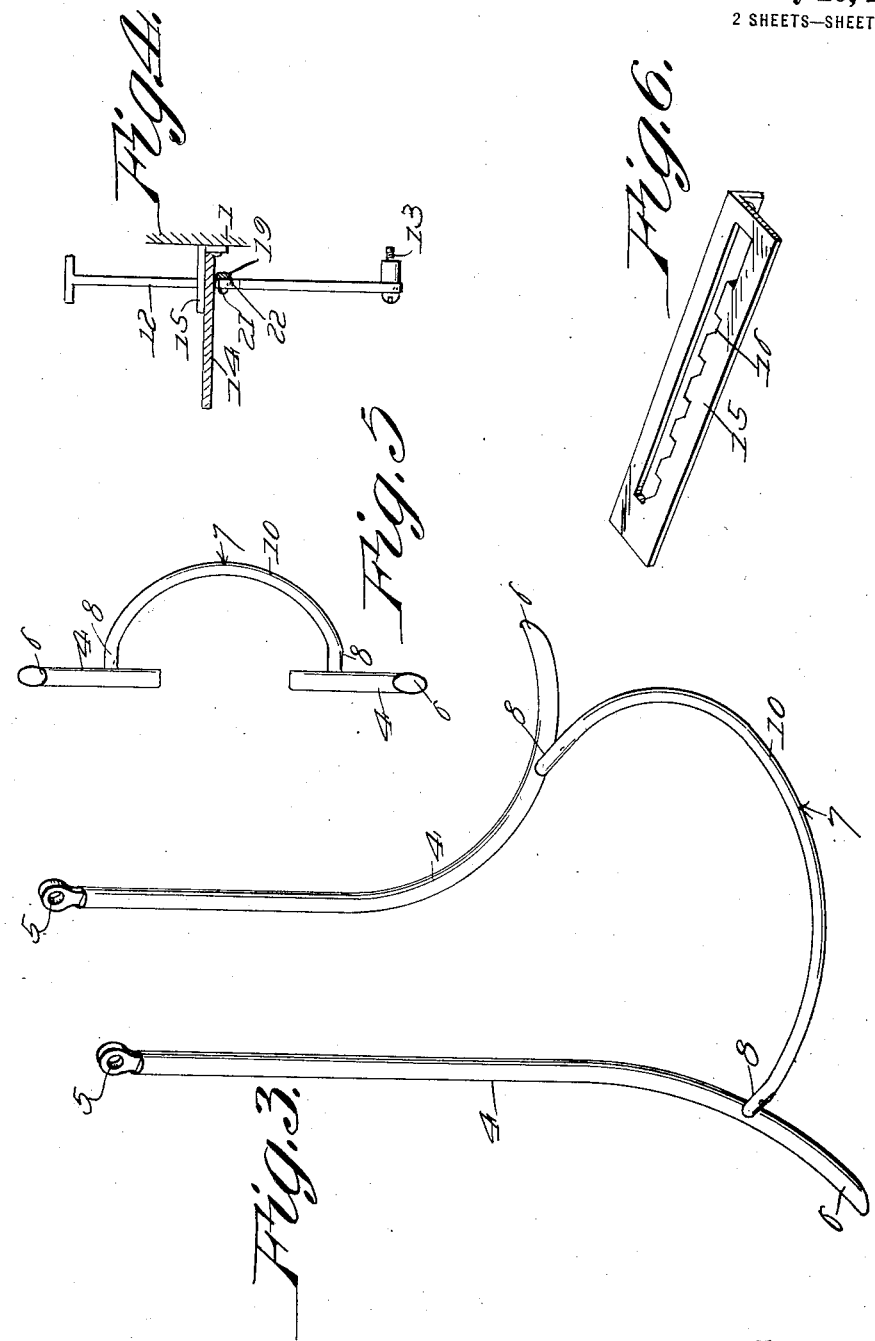

UNITED STATES PATENT OFFICE.

CLARENCE B. TINSLEY, OF CLEVELAND, OHIO.

MOTORCYCLE-STAND.

1,347,355.  Specification of Letters Patent.  Patented July 20, 1920.

Application filed May 12, 1919. Serial No. 296,416.

*To all whom it may concern:*

Be it known that I, CLARENCE B. TINSLEY, a citizen of the United States, residing at Cleveland, in the county of Cuyahoga and State of Ohio, have invented new and useful Improvements in Motorcycle-Stands, of which the following is a specification.

This invention comprehends generally improvements in motorcycle attachments, and more particularly relates to a motorcycle stand.

The invention has for its principal aim and object to provide a device of the above mentioned character designed to be readily attached to the rear axle and frame of the vehicle and operated by the foot of the rider for swinging the support, forming a part of the device, into engagement with the ground, when desired, so as to support the rear wheel in slightly spaced relation to the ground, while improved resilient means act in conjunction with the lever for returning the support to an inactive position subsequent to the release of the lever.

It is an equally important object of this invention to provide a device of the above mentioned character, the construction of which is novel in form, while the parts are arranged so that they may be conveniently actuated by the rider when seated on the machine, thereby obviating the necessity of first getting off the motorcycle before adjusting the stand.

More specific objects of this invention include the provision of a device of the above mentioned character wherein the support proper is of novel form and is designed so that it will not engage and drag objects along the ground when in an operable position; and to provide coöperative means for assuring of the maintenance of the support in either of its adjusted positions.

Among the other aims and objects of this invention may be recited the provision of a device of the character described with a view to compactness, and in which the number of parts are few, the construction simple and the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Figure 1 is a side elevation of the device attached to a motorcycle.

Fig. 2 is a top plan view thereof.

Fig. 3 is a perspective view of the support proper.

Fig. 4 is a sectional detail taken on line 4—4 of Fig. 1.

Fig. 5 is a bottom plan view of the structure of Fig. 3.

Fig. 6 is a perspective view of the rack bar.

Similar characters of reference are employed in all of the above described views, to indicate corresponding parts.

Referring now, more particularly, to the accompanying drawings there is provided a motorcycle consisting generally of a frame 1, while operably connected to the rear axle 2 and the forward part of the frame is the improved manually operable stand indicated generally by the numeral 3.

In the present instance the improved stand consists of a support which may be said to comprise space supporting legs 4, the upper ends of which are formed with openings 5 for rotatable disposition about the rear axle 2, while the lower portions of the legs are bent slightly outwardly and in a curved form, terminating in feet 6. A brace 7 of a substantial U-shaped configuration has its side arms 8 joined with the curved portions of the legs 4, while these side arms are offset as at 9 near the intermediate portion 10 to provide contact points which coöperate with the feet 6 and contact with the ground for assuring of the proper supporting of the rear wheel of the motorcycle in slightly spaced relation to the ground when the support is in a depending operative position. The arms 8 are inclined slightly upwardly as at 11 so as to maintain the intermediate or arched portion in spaced relation to the ground and thereby prevent this portion from engaging or dragging objects which may be in the street or road. This of course may be occasioned preparatory to stopping the machine when the support has been swung into an operative position.

With a view toward providing improved manually operable means for adjusting the support so as to move the same into an operative or inoperative position, a foot pedal or lever 12 is pivotally mounted as at 13 on the frame at a point beneath one of the foot rests 14 and the upper portion of this foot pedal operates in the slot of a rack bar 15. This rack bar is formed with a series of teeth 16 on one side of the slot for a purpose that will presently appear. It is also to be noted that the upper foot engaging portion of the pedal or lever 12 is positioned in proximity to the foot rest 14. The sectional connecting rod generally indicated by the numeral 18 is now employed and consists of sections 19 and 20, the former of which is pivotally connected by means of a pintle 21 to a lateral arm 22 which is integral with and extends from the lever or pedal 12 medially of the ends thereof. The adjacent ends of the sections 19 and 20 are formed with substantial hooks 23, while disposed about these adjacent end portions of the rods is a coiled shock absorbing spring 24, the respective ends of which bear against the hooks 23, as indicated. The opposite end of the section 20 is pivotally connected by means of a pintle 25 to the outer end of an arm 26 which is offset from and integral with one of the legs 4 of the support 3.

As intimated, suitable resilient means have been employed to normally hold the support in an inactive position. In reducing this feature of the invention to practice, a coiled compression spring 27 is provided and has one end connected to the section 19 of the connecting rod 18 near the pivotal point 21, while the opposite end is connected to the frame of the motorcycle at a point rearwardly of the adjacent foot rest 14 so that the tension of the spring normally serves to hold the lever or pedal 12 near the rear end of the rack bar and behind the shoulder 17 which of course locks the lever against forward movement. When the lever is in such position it is apparent that the support 3 is arranged in spaced relation to the ground and in the rear of the rear wheel, permitting of the engagement of the latter with the ground. In order to swing the support into an operative position the rider uses one of his feet to press the lever or pedal 12 forwardly against the tension of the spring 27 and in view of the connecting rod 18, the support 3 is of course swung downwardly and inwardly so that the feet 6 and the contact points 9 engage the ground in such a manner as to maintain the rear wheel in slightly spaced relation to the ground, as is apparent. Of course, the spring 27 serves as a means for automatically returning the support into an inactive position, subsequent to the release of the foot pedal 12 from one of the notches 16. Ordinarily these notches coöperate with the foot pedal in locking the parts in the desired position of adjustment thus preventing accidental collapsing of the stand when in an operative position. In this connection it is to be observed that the construction of the support is such that when securely held by the adjusting means that the possibility of the motorcycle being knocked over when left in a standing position is reduced to a minimum as the motorcycle, with the device attached will have a tendency to slide over the ground in an upright position.

It is thought in view of the foregoing description that a further detailed description of the operation of the invention is entirely unnecessary. Likewise it is believed that the advantages of the invention will be readily apparent.

What is claimed is:—

1. A device of the character described including a swingingly mounted support, a pivotally mounted foot pedal, a rigidly mounted rack bar composed of spaced sides, a plurality of teeth, a shoulder formed on the inner surface of one of the sides of the rack bar, the shoulder being positioned near the rear end of the rack bar, the foot pedal operating between the sides of the rack bar and being engageable with any of the teeth or the shoulder, a connecting rod operably arranged between the pedal and the support, and a coil compression spring connected to the connecting rod near its point of connection of the pedal and to the frame for either facilitating the maintenance of the pedal in engagement with any one of the teeth so as to consequently retain the support in an operative position or for automatically returning the support to an inactive position so that the lever will be positioned in engagement with the shoulder.

2. A device of the character described including a swingingly mounted support, an arm offset therefrom, a shock absorbing sectional connecting rod, one section of which is operably connected to the support, a pivotally mounted foot pedal, an arm offset therefrom and operably connected with the adjacent end of the other section of the connecting rod, means for locking the pedal so as to maintain the support in either an operative or an inactive position, and resilient means coöperating with the locking means for facilitating the maintenance of the pedal in any of its latched or locked positions or for automatically returning the support to an inactive position subsequent to the release of the pedals.

In testimony whereof I affix my signature.

CLARENCE B. TINSLEY.